C. FISHBAUGH.
Chain-Pump.
No. 163,859.  Patented June 1, 1875.
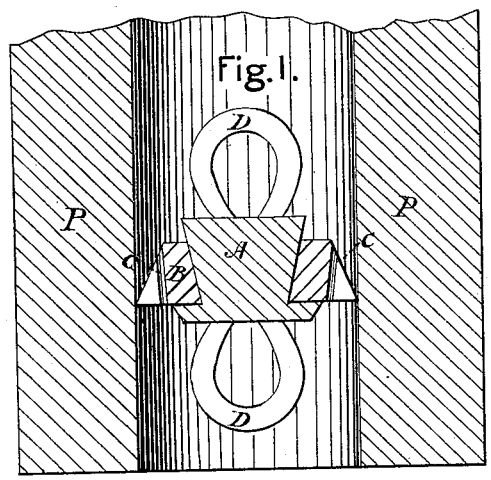
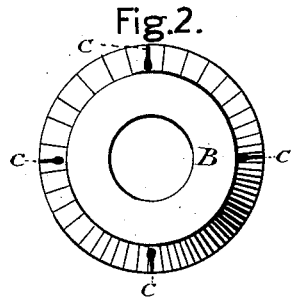
Witnesses.  
A. Howard Byers  
J. S. Byers
Inventor.  
Charles Fishbaugh  
By A. H. Byers, Atty

UNITED STATES PATENT OFFICE.

CHARLES FISHBAUGH, OF TIFFIN, OHIO.

IMPROVEMENT IN CHAIN-PUMPS.

Specification forming part of Letters Patent No. 163,859, dated June 1, 1875; application filed April 27, 1875.

*To all whom it may concern:*

Be it known that I, CHARLES FISHBAUGH, of Tiffin, State of Ohio, have invented an Improvement in Chain-Pumps, of which the following is a specification:

Figure 1 represents a sectional view of my invention. P indicates the pump-stock, and is the same used in ordinary chain-pumps, with this exception, that I run a hot iron through the bore, of the same size as the required hole, which takes off the roughness left in boring. A is a cone-shaped piece of metal, provided with a flange at the bottom, and with links D D at the top and bottom. B represents a bevel-edged rubber collar, the center of which fits tightly the cone-shaped piece A, and the under side rests upon the flange at the bottom.

Fig. 2 is an end view of the bevel-edged rubber collar B, having one or more slits and holes, C C C C, cut through the beveled edge toward the center, the holes being at the end of the slits nearest the center of the rubber collar.

Any number of links can be attached to the top and bottom, so as to allow one or more flanges and collars to be in the pump-stock at the same time. The cone and flange may be made of block-tin, or any suitable material.

The slits and holes in the rubber collar B have these advantages over the notch now in use: They will prevent the rubber from wearing out, and the hole always leaves a passage for the water. Where the notch now in use is often pressed together when fitting the pump-stock closely, closing the passage, and endangering the pump from freezing, the number of slits and holes allow the rubber to contract without offering so much resistance, which is a great advantage over those now in use.

I claim as my invention—

1. The bevel-edged rubber collar B, provided with one or more slits and holes, C C C C, substantially as described.

2. The combination of the bevel-edged rubber collar B, with one or more slits and holes, C C C C, with the cone and flange A, and the inner surface of the pump-stock P burned, substantially as described.

CHARLES FISHBAUGH.

Witnesses:
A. H. BYERS,
J. S. BYERS.